(12) United States Patent
Lucke

(10) Patent No.: US 6,925,609 B1
(45) Date of Patent: Aug. 2, 2005

(54) HYBRID TASK AND FILE ORIENTED USER INTERFACE

(75) Inventor: Holly Michelle Lucke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 09/495,217

(22) Filed: Jan. 31, 2000

(51) Int. Cl.[7] .............................................. G06F 3/00
(52) U.S. Cl. ...................... 715/804; 715/781; 715/810; 715/835; 719/329
(58) Field of Search ................................. 345/763–765, 345/769, 781, 804, 810, 835, 846, 966–967; 709/100, 315, 328–329, 331–332; 715/763–765, 769–781, 804, 810, 835, 846, 966, 967; 719/315, 328, 329, 331, 332

(56) References Cited

U.S. PATENT DOCUMENTS

| | | | | |
|---|---|---|---|---|
| 5,325,533 A | * | 6/1994 | McInerney et al. | 717/107 |
| 6,046,742 A | * | 4/2000 | Chari | 345/734 |
| 6,147,685 A | * | 11/2000 | Bliss et al. | 345/769 |
| 6,268,852 B1 | * | 7/2001 | Lindhorst et al. | 345/744 |
| 6,272,537 B1 | * | 8/2001 | Kekic et al. | 709/223 |
| 6,317,142 B1 | * | 11/2001 | Decoste et al. | 345/762 |
| 6,344,862 B1 | * | 2/2002 | Williams et al. | 345/781 |
| 6,388,683 B1 | * | 5/2002 | Ishai et al. | 345/765 |

* cited by examiner

Primary Examiner—X. L. Bautista
(74) Attorney, Agent, or Firm—Roy W. Truelson

(57) ABSTRACT

An interactive process navigation window is a hybrid of a file-based paradigm and a task-based paradigm. The window contains multiple panes, in which at least one pane (object pane) lists objects, while another pane lists tasks which are applicable to a selected object in the object pane, and which serves as a launchpad for various application software. A root object pane is placed in the upper left portion of the window, displaying groupings and sub-groupings of objects. A content object pane is placed in the upper right portion, the content pane displaying the contents of a group selected from the root pane. A task pane occupies the bottom of the window, the task pane displaying tasks applicable to the group selected from the root pane. In one embodiment, the task pane is divided into two parts, one of which displays tasks related to a selected group from the root pane, as described above, while the other displays a user-configurable list of frequently performed tasks, which does not vary with the contents of the object pane(s). The navigation window described herein provides diverse users with an interface which is both task-oriented and object-oriented, making it easy to switch from one paradigm to the other, depending on user preference, the type of task to be performed, or other appropriate factors.

16 Claims, 10 Drawing Sheets

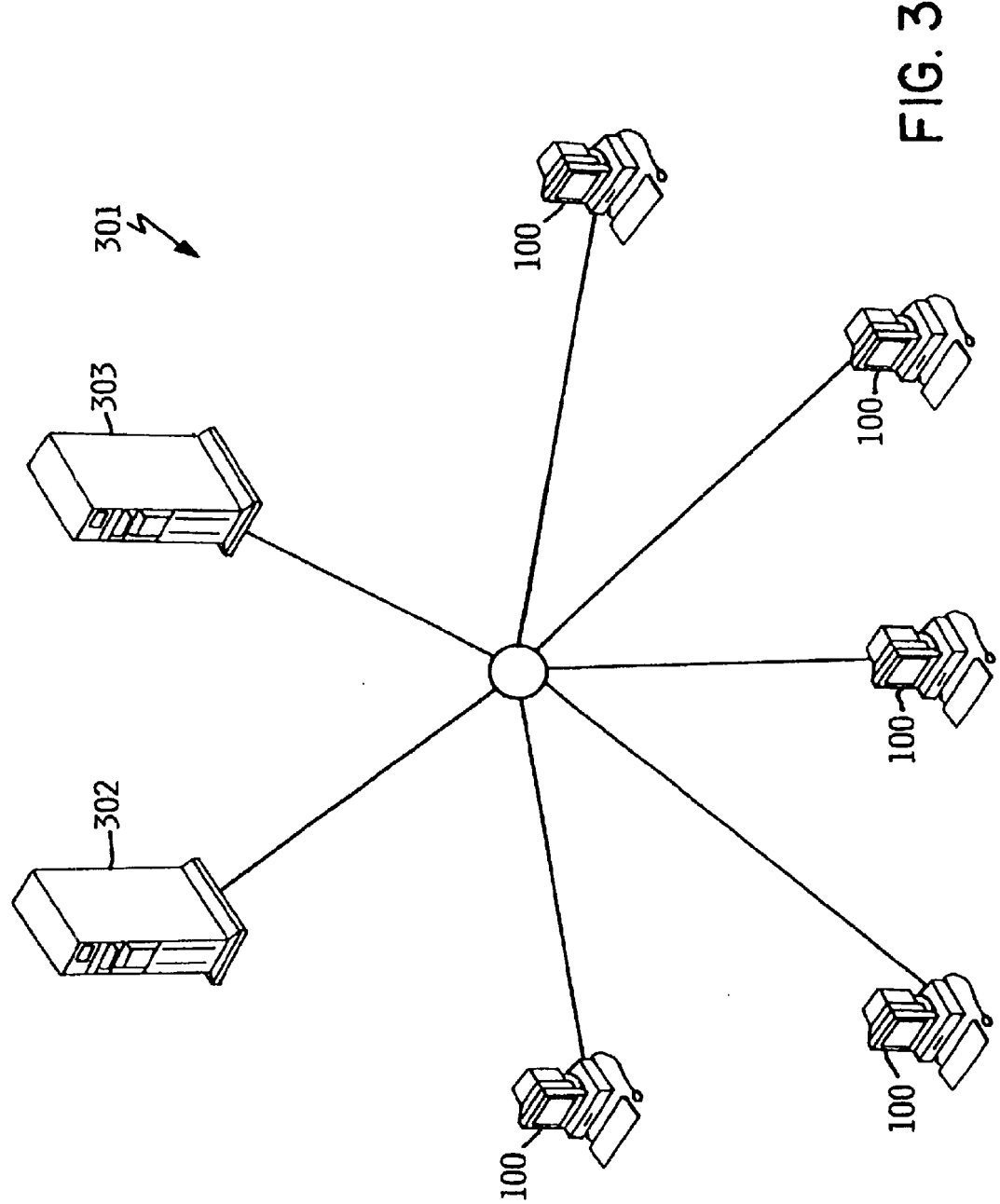

HYBRID TASK AND FILE ORIENTED USER INTERFACE

FIELD OF THE INVENTION

The present invention relates to digital data processing, and in particular, to computer user interfaces which support initiation of user actions.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Early computer systems were very expensive and difficult to use, capable of being programmed and manipulated by only a handful of highly-educated specialists. The cost of operating such computers was correspondingly high, and they were therefore used for only the most essential tasks. The dynamic which has driven the information revolution is the sustained reduction in the cost of computing. Thus, information which was too expensive to gather, store and process a few years ago, is now economically feasible to manipulate via computer. The reduced cost of information processing drives increasing productivity in a snowballing effect, because product designs, manufacturing processes, resource scheduling, administrative chores, and many other factors, are made more efficient.

The cost of information processing not only includes the cost of computer hardware and software, but perhaps even more significantly, the cost of human resources devoted to gathering and processing information using computer systems. Improvements to the usability of computer hardware and software reduce the cost of human resources associated with information processing, either by reducing the amount of time directly devoted to a particular task by a human operator (user), or by reducing the level of training required of a user in order to achieve proficiency in performing the task. Continued progress of the information revolution requires still further improvements to the usability of computer systems.

Graphical user interfaces (GUIs) have become standard user interfaces for a variety of software applications. Among the standard features of such GUIs are selectable icons for performing an action, toolbars and the like which offer selections to the user, and pull-down menus which offer still further selections. A common characteristic of all these is that the user may select one action from among multiple actions offered using a pointing device or similar input, without having to type in the name of an action. In theory, this frees the user from the need to remember commands or other selection identifiers.

One conventional form of window in a GUI is a file-based or object-based window from which actions can be selected. I.e., the window displays a listing of files or objects. The window may display collections of files such as folders, subdirectories, etc. The user may select one or more such objects. The user selects actions to perform with respect to the selected object(s) from a toolbar, pull-down menu, pop-up menu, or other means. Such a window may be divided into multiple frames, wherein, e.g., collections of files are displayed in one frame, and the contents of a selected collection of files is displayed in another frame. This type of window is so pervasive that users take it for granted. It may exist as a form of stand-alone application, for supporting file manipulation or launching other operations, as in Microsoft Windows Explorer™. It may also exist within an application for selecting files, e.g., a word processing application may have a pop-up window of this type for selecting a file to be edited.

With the constant search for alternative or improved user interfaces, task-based forms of window interface (often referred to as taskpads) have gained some popularity in recent years. A task-based window follows a different paradigm from that of the traditional file-based window. The task-based window lists a plurality of tasks which a user can perform, from which the user selects a task for execution. Depending on the nature of the task selected and the environment in which the task-based window is operating, the selection of a task may require the user to select a file or files upon which the task should be performed, in which case a pop-up file selection window may appear.

In theory, there are many situations in which a user is likely to think in terms of tasks to be performed, rather than files upon which to work. A taskpad interface lists tasks, which serves as a reminder of things to be done, and provides a more direct form of task navigation. A taskpad interface is therefore a more natural extension of the user's own mind, and for these situations, it may be more natural or easy for a user to work from a taskpad than from a traditional file-based window. It should be understood that the taskpad interface is not intended as a universal replacement for file-based windows; it is simply an alternative interface which some users may find easier to use in some circumstances.

While the taskpad may help some users, there remain drawbacks to its wider use. For one thing, users have used traditional file-based windows for such a long time that changing the paradigm can make some users uncomfortable. But perhaps more fundamentally, there is a chicken-and-egg problem with deciding whether to use file-based windows or taskpads. For most user operations, the user will have to select both a file and a task. Generally, a user can't select a task without having some notion of the file to be processed, and vice-versa. When this is considered, the supposed advantage of taskpads largely evaporates. Whether file-based windows or task-based windows are used, the user must still think in two dimensions about actions and files. The taskpad interface doesn't offer the user any help in the "file" dimension, which may well be where the user needs help the most.

A need exists for yet improved user interfaces which build upon the strengths of the prior art alternatives while minimizing their drawbacks.

SUMMARY OF THE INVENTION

In accordance with the present invention, an interactive process navigation window of a user workstation is a hybrid of a file-based paradigm and a task-based paradigm. Specifically, the window contains multiple panes, in which at least one pane (object pane) lists objects, while another pane lists tasks which are applicable to selected objects in the object pane.

In the preferred embodiment, the process navigation window functions as an application launchpad for various application software. A root pane (an object-type pane) is placed in the upper left portion of the window, displaying an object directory tree structure at a high level. I.e., the root pane displays groupings and sub-groupings of objects. A content pane (another object-type pane) is placed in the upper right portion of the window, the content pane displaying the contents of a group selected from the root pane. A task pane occupies the bottom of the window, the task pane displaying tasks applicable to the group selected from the root file system pane.

In the preferred embodiment, the process navigation window is displayed on a client workstation attached to one or more server computers via a network. Generally, the context of tasks selected from the task pane is a specific server system which is selected by implication from the root pane. However, in an alternative embodiment, context may be object specific, so that selection of such a task from the task pane will perform the task on an object selected from the directory content pane.

In one embodiment, the task pane is divided into two parts, one of which displays tasks related to a selected group from the root pane, as described above, while the other displays a list of frequently performed tasks, from which a task may be selected. This list does not vary with the contents of the object pane(s). This second portion of the task pane therefore provides a short-cut to certain tasks. Tasks are added to or deleted from the list by the user.

The process navigation function described herein provides diverse users with an interface which is both task-oriented and object-oriented, making it easy to switch from one paradigm to the other, depending on user preference, the type of task to be performed, or other appropriate factors.

The details of the present invention, both as to its structure and operation, can best be understood in reference to the accompanying drawings, in which like reference numerals refer to like parts, and in which:

BRIEF DESCRIPTION OF THE DRAWING

FIG. 3 is a conceptual illustration of the network environment in which client workstation and server systems operate, according to the preferred embodiment.

DETAILED DESCRIPTION OF THE PREFERRED EMBODIMENT

Figure 1:
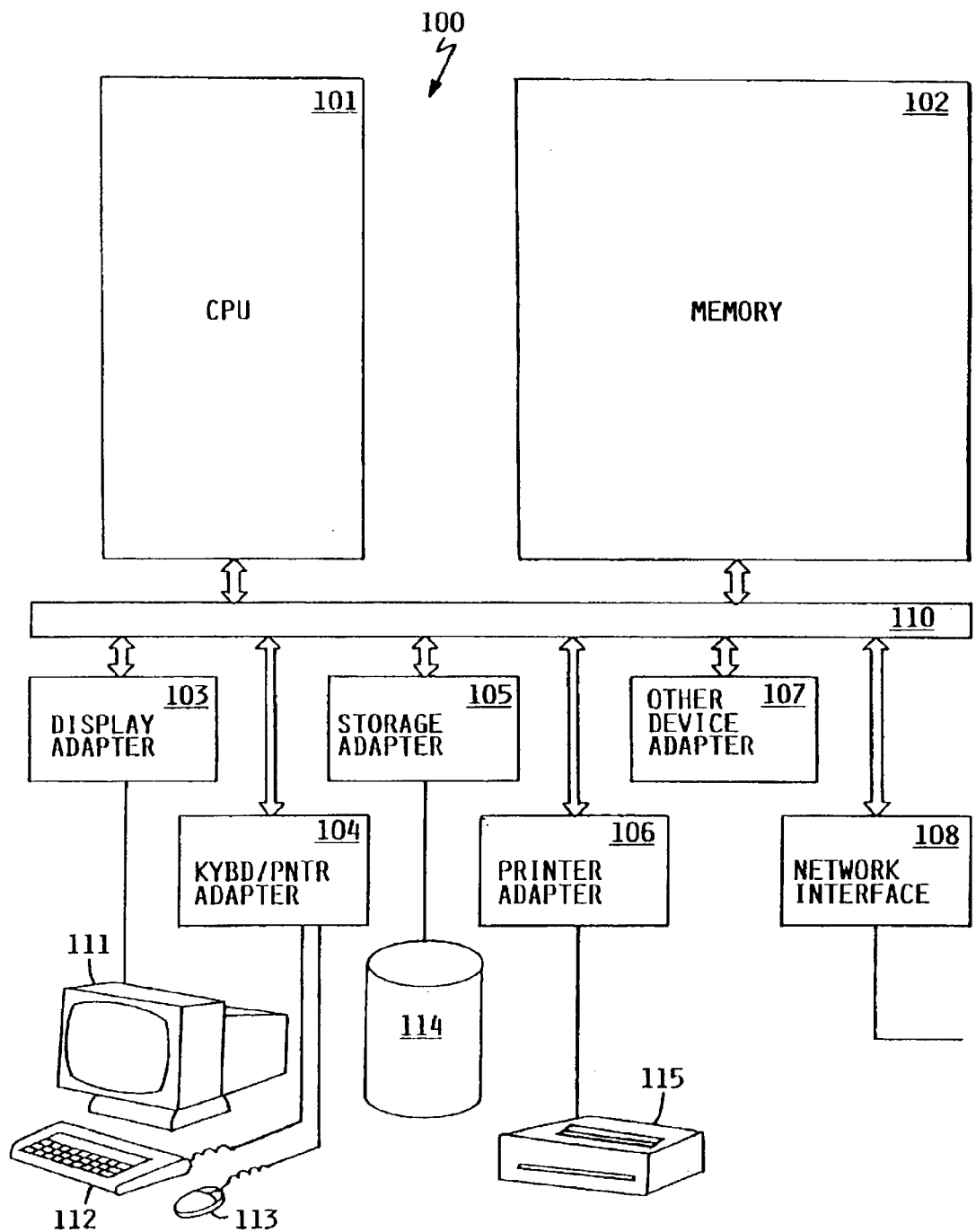
FIG. 1 is a high-level block diagram of an interactive client workstation computer system from which a user performs useful work, according to the preferred embodiment of the present invention.

Referring to the Drawing, wherein like numbers denote like parts throughout the several views, FIG. 1 is a high-level block diagram of a typical interactive client workstation computer system 100, from which a user performs useful work, according to the preferred embodiment. Client workstation computer system 100 includes CPU 101, main memory 102, various device adapters and interfaces 103–108, and communications bus 110. CPU 101 is a general-purpose programmable processor, executing instructions stored in memory 102; while a single CPU is shown in FIG. 1, it should be understood that computer systems having multiple CPUs could be used. Memory 102 is a random-access semiconductor memory for storing data and programs; memory is shown conceptually as a single monolithic entity, it being understood that memory is often arranged in a hierarchy of caches and other memory devices. Communications bus 110 supports transfer of data, commands and other information between different devices; while shown in simplified form as a single bus, it may be structured as multiple buses, and may be arranged in a hierarchical form. Display adapter 103 supports video display 111, which is typically a cathode-ray tube display, although other display technologies may be used. Keyboard/pointer adapter 104 supports keyboard 112 and pointing device 113, depicted as a mouse, it being understood that other forms of input devices could be used. Storage adapter 105 supports one or more data storage devices 114, which are typically rotating magnetic hard disk drives, although other data storage devices could be used. Printer adapter 106 supports printer 115. Adapter 107 may support any of a variety of additional devices, such as CD-ROM drives, audio devices, etc. Server interface 108 provides a physical interface to a server computer system, the server providing access to common data used by a group of users. In the preferred embodiment, the server interface is through a local area network, such as an Ethernet or Token Ring network. However, many other types of interface are possible. For example, the interface may be a mainframe terminal channel interface, such as might be used to connect multiple workstations to a single larger mainframe computer acting as a server. Alternatively, the interface may be through a wide area network, such as the Internet. Computer system 100 will typically be any of various models of single-user computer systems known as "personal computers". The representation of FIG. 1 is intended as an exemplary simplified representation, it being understood that many variations in system configuration are possible in addition to those mentioned here. Furthermore, a client workstation for performing certain process related tasks in accordance with the present invention need not be a personal computer system, and may be a so-called dumb terminal attached to a mainframe, a notebook or laptop computer, a special-purpose device, or any of various hardware variations.

In the preferred embodiment, the server is an IBM AS/400 computer system, to which multiple client workstations 100 are attached. In an AS/400 environment, all data and programs are contained in "objects". An "object" is an entity having a persistent address assignment in a large virtual address space, wherein the contents of an object are accessed through certain defined interfaces. A file is a type of object. A group of files or objects, such as a directory, subdirectory, or folder, is another type of object. In many systems, which do not have the object orientation of the AS/400 system, the object pane(s) described herein would display files or directories (instead of "objects"), operations would be performed on files (instead of "objects"), and so on. Unless indicated otherwise by the context herein, the term "object" should be taken to include "file" or a group of files, such as a "directory".

Figure 2:
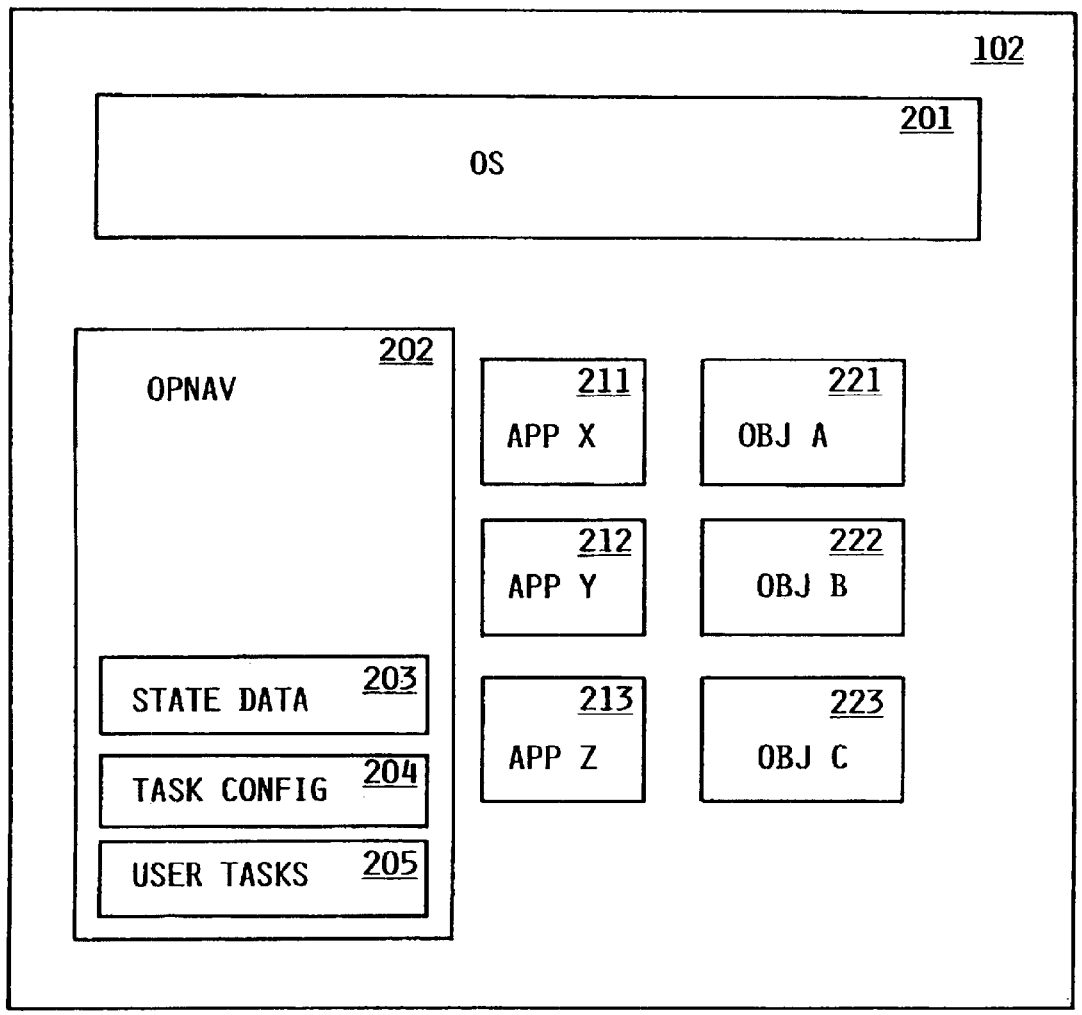
FIG. 2 is a conceptual illustration of the major software components of the client workstation computer system, according to the preferred embodiment.

FIG. 2 is a conceptual illustration of the major software components of client workstation system 100 in memory 102. Operating system 201 provides various low-level software functions, such as device interfaces, management of memory pages, management of windowing interfaces, management of multiple tasks, etc. as is well-known in the art. In the preferred embodiment, operating system 201 is a Microsoft Windows NT™ operating system, it being understood that other operating systems could be used. Operations Navigator software 202 provides an interactive user interface for managing objects and launching tasks, as more fully explained herein. Operations Navigator 202 includes server state data 203 which stores a local copy of object listings, groups of objects and other state information obtained from the server. Operations Navigator 202 further includes task configuration table 204, which associates sets of tasks with high-level objects (groups of objects), and user task profile 205, which contains certain user-selected commonly used tasks. Task configuration table 204 and user task profile 205 are used to construct task panes, as herein described. Various task applications 211–213 reside in memory 102; these may be invoked through Operations Navigator 202, or alternatively through any of various conventional programming constructs available to the user. These tasks may be performed entirely on client workstation 100, or may require remote calls another computer system such as the server system. Memory 102 may also contain data objects 221–223, upon which some task or tasks are performed. Typically, objects 221–223 in client system 100 are copies of objects in a central file repository on a server, which are transferred from the server to client workstation 100 for processing. When processing is complete, these files, if changed, may be returned to the server.

While a certain number of object, tasks, and other entities are shown, it will be understood that these are shown for purposes of illustration only, and that the actual number of such entities may vary. Additionally, while the software components of FIG. 2 are shown conceptually as residing in memory, it will be understood that in general the memory of a computer system will be too small to hold all programs and data simultaneously, and that information is typically stored in data storage 104, comprising one or more mass storage devices such as rotating magnetic disk drives, and that the information is paged into memory by the operating system as required.

FIG. 3 is a conceptual illustration of the network environment 301 in which workstation 100 operates. As shown in FIG. 3, multiple user workstations 100 are connected via a communications medium to servers 302 and 303. Each workstation has its own copy of Operations Navigator software 202, server state data 203, task configuration table 204, user task profile, and applications 211–213. Each workstation 100 may also have its own copy of any objects 221–223 it is processing locally, although in most cases the object on one workstation will not be the same as the objects on another. Typically, each user workstation 100 is used by a single individual, e.g., on a desktop in an office or cubicle. However, it would be possible for users to share workstations. Objects 221–223 are normally stored on one of servers 302, 303, which act as object libraries. Objects 221–223 may be copied from the library by requesting a copy of the file from central file server 302, edited on a workstation 100, and returned to the appropriate server after editing. The server is responsible for any locking or similar mechanisms required for maintaining file integrity among the multiple users, as is known in the art. In the preferred embodiment, servers 302, 303 are IBM AS/400 computer systems, it being understood that other systems could be used. Servers 302, 303 are hereinafter referred to generically as server 302, this reference number designating one or more servers attached to the network. The communications medium may be, e.g., a Token Ring, an Ethernet, or other, as may be typical in a local area network, or may be a wide area network communications medium, including wireless communications media. Additionally, the network may be a host mainframe computer which is attached through channels to multiple workstations. It will be understood that the network of FIG. 3 is a simplified conceptual illustration, and that the number and configuration of servers and workstations may vary considerably.

In the preferred embodiment, Operations Navigator 202 presents an interactive interface to a user of workstation 100 which enables the user to manage objects and launch tasks. Specifically, the interactive environment is a window having three panes: a root object pane in the upper left portion of the window for displaying high-level objects (i.e., groups of objects, like directories or folders); a content pane for displaying lower-level objects which make up a group of objects selected from the root pane; and a task pane displaying tasks that can be performed with respect to a selected object. In the environment of the preferred embodiment, most tasks launched by Operations Navigator 202 are executed on server 302, although some tasks may execute locally. Operations Navigator 202 is an application executing under a multi-tasking operating system. Computer system 100 may support the concurrent execution of other applications, which are presented to the user through other interactive windows. Specifically, it is possible that any or all of the tasks which may be invoked through Operations Navigator 202 may be invoked through other means in the multi-tasking environment. Operations Navigator 202 is therefore an interface for the user to accomplish certain things, and is not necessarily the sole means by which tasks listed therein may be invoked.

Figure 4A:
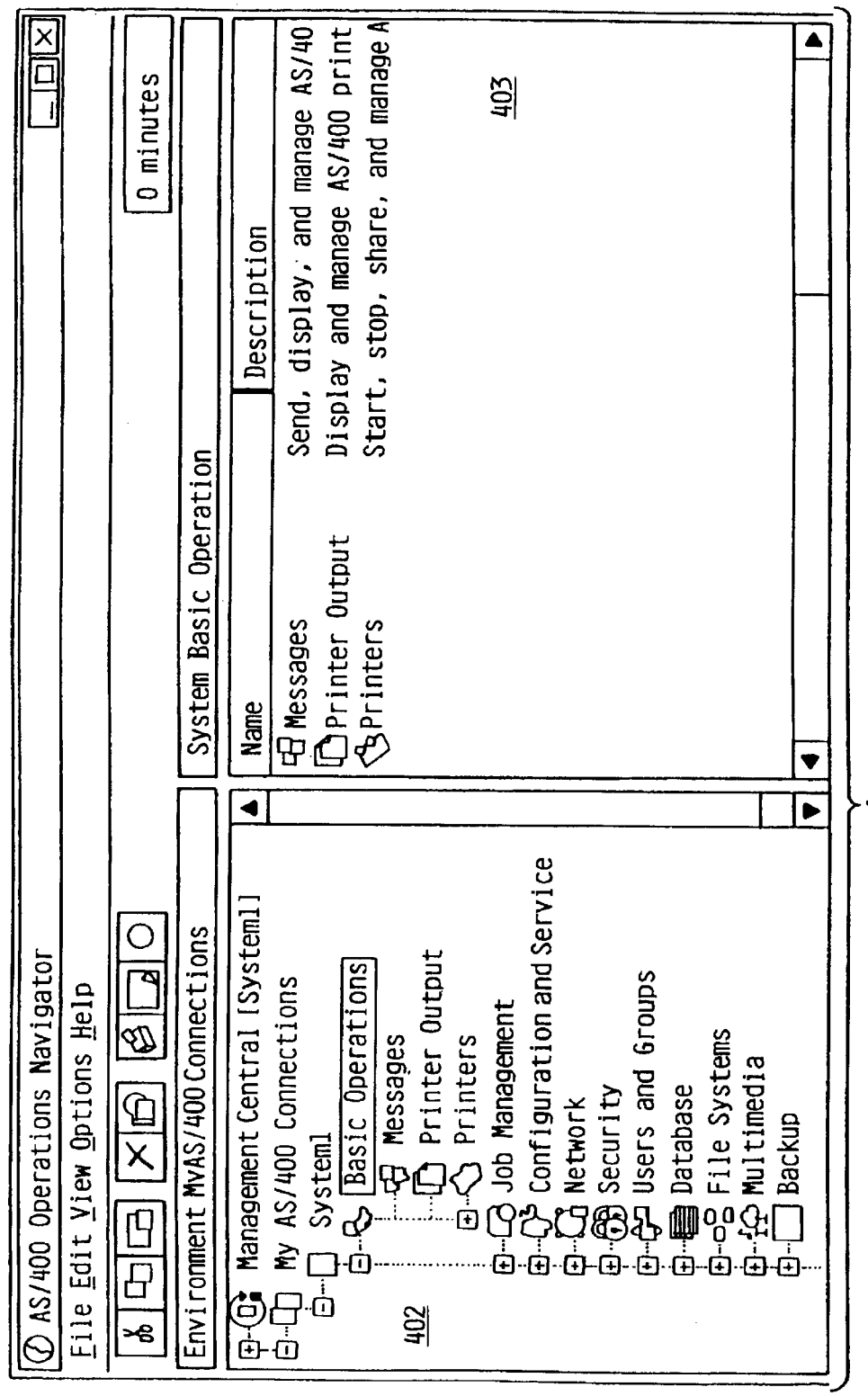
FIGS. 4–6 illustrate various examples of process navigation windows for selecting objects and tasks, FIG. 4 showing a window according to the preferred embodiment having a high level object selected, FIG. 5 showing a window according to the preferred embodiment having a lower level object selected, and FIG. 6 showing a window according to an alternative embodiment without a user-configurable task pane portion.
Figure 4B:
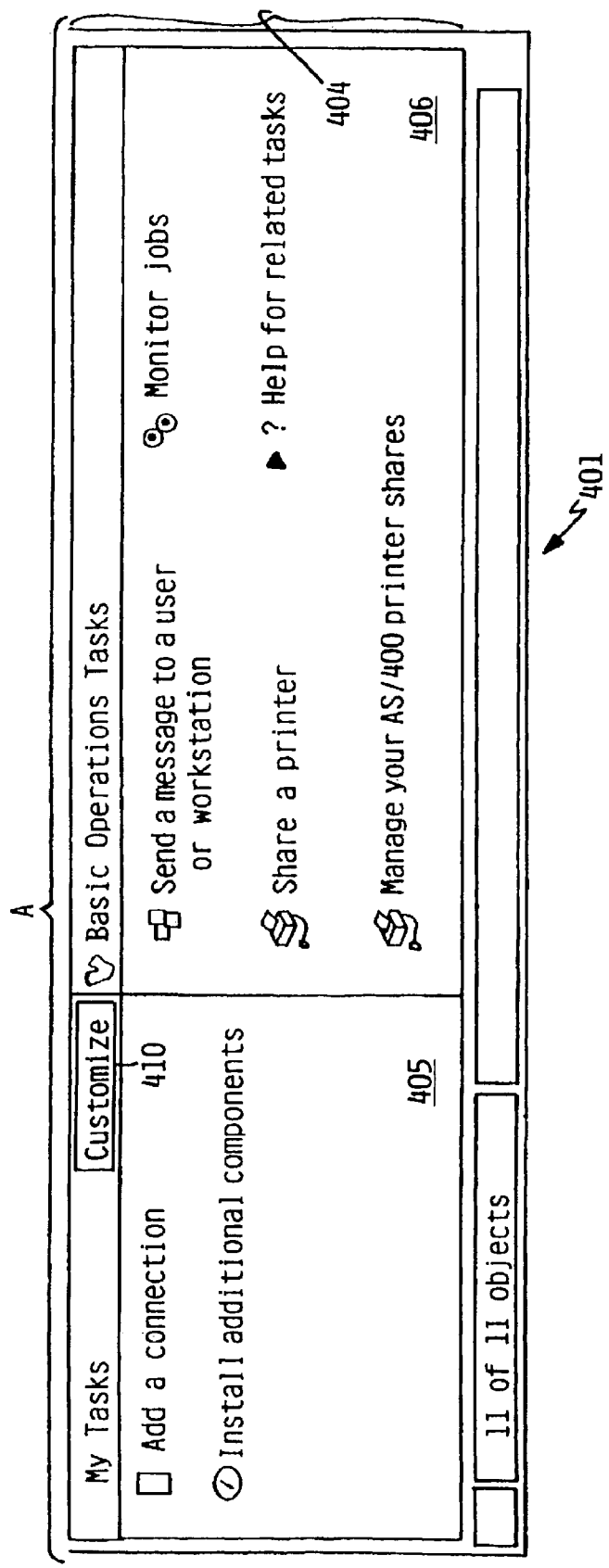
Figure 5A:
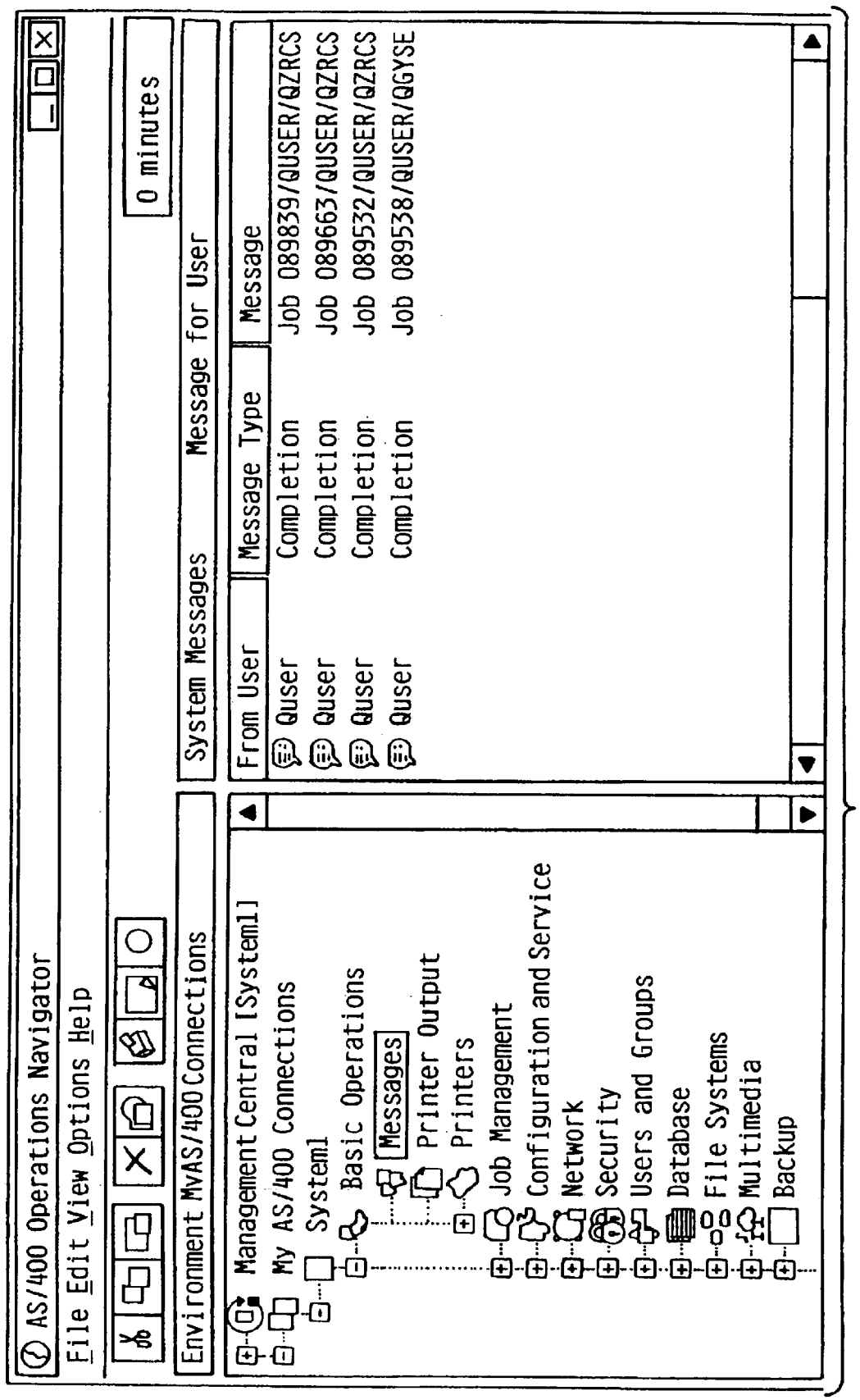
Figure 5B:
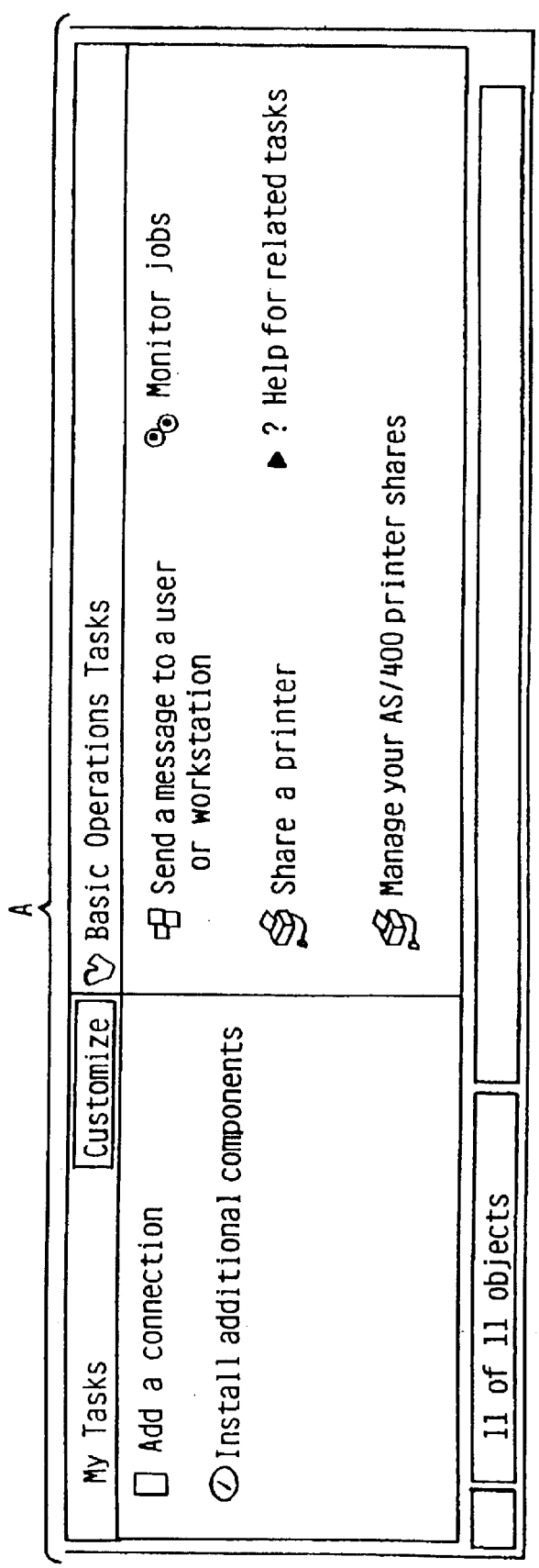
Figure 6A:
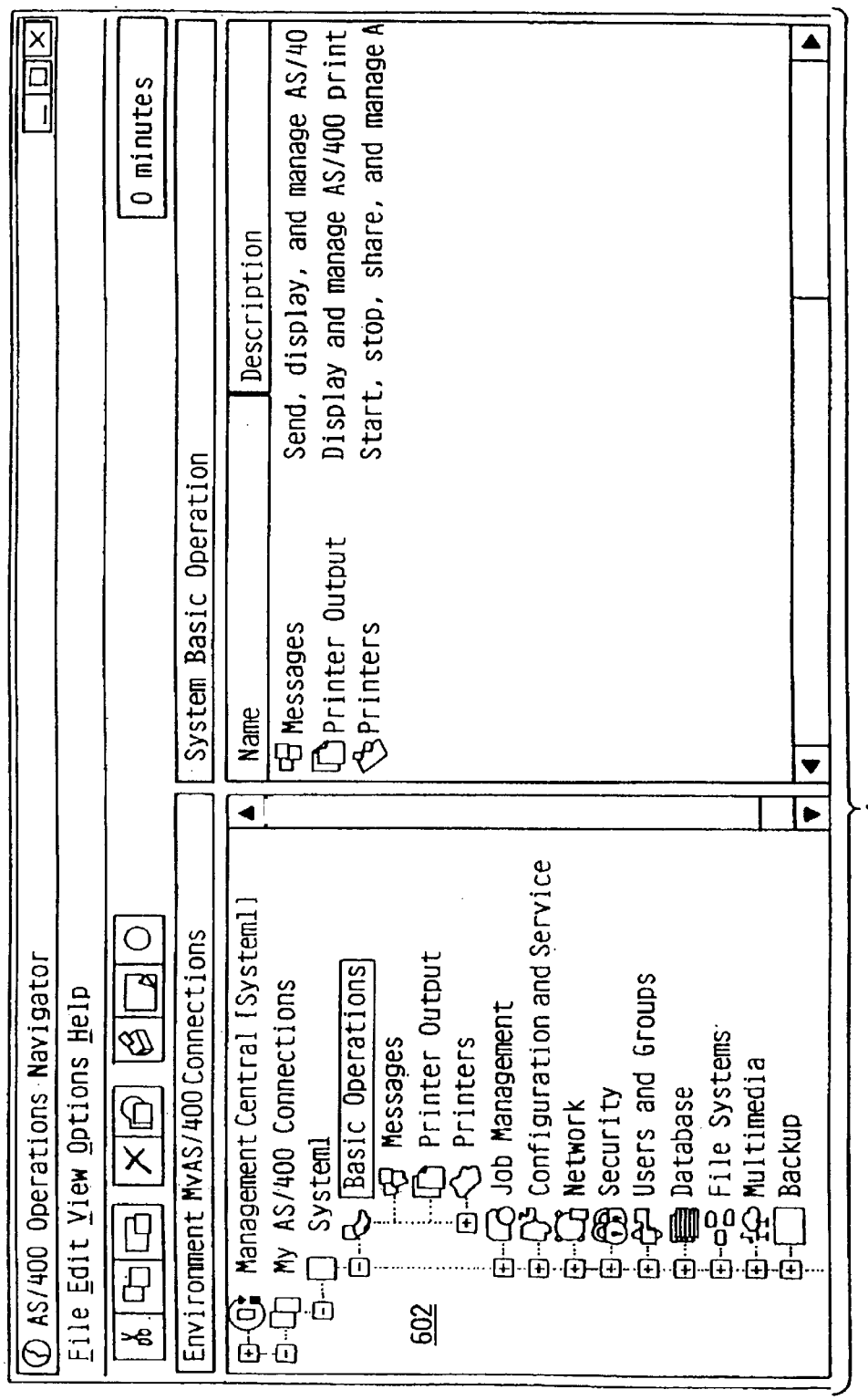
Figure 6B:
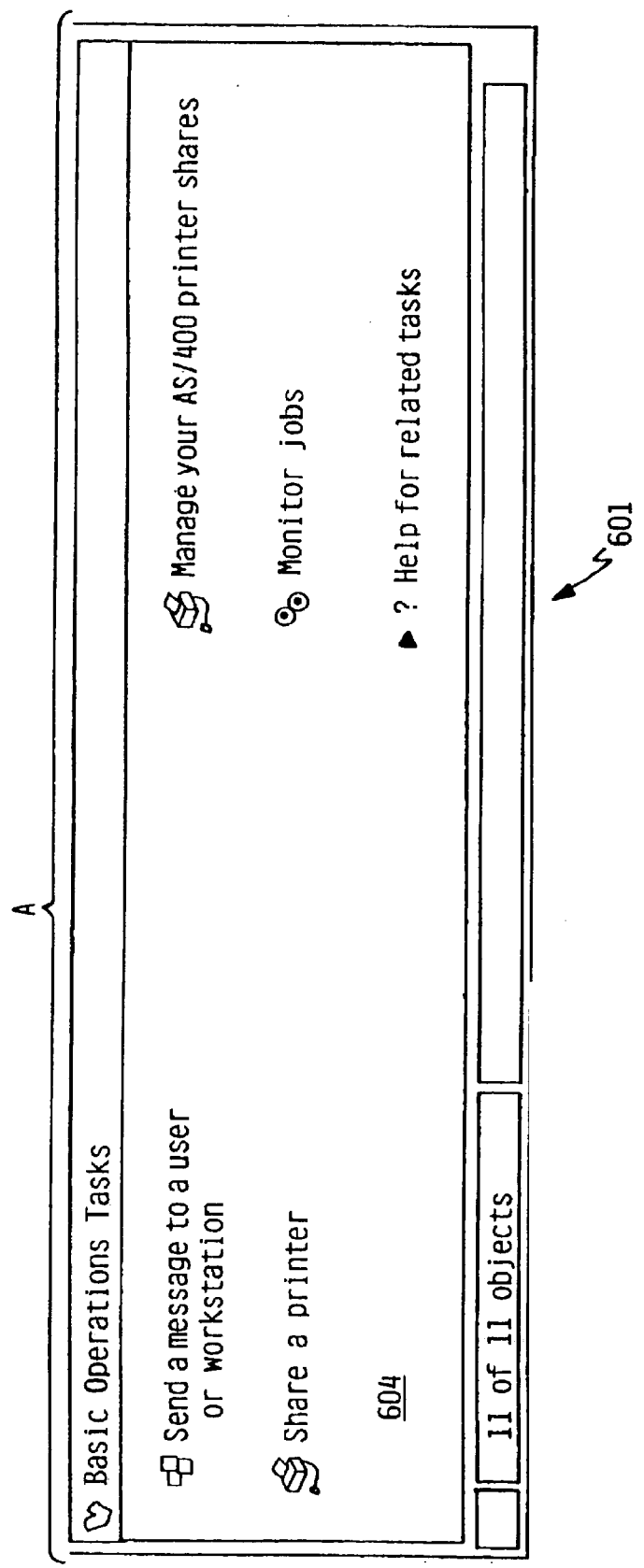

FIGS. 4–6 illustrate various versions of the Operations Navigator interactive window presented on display 111 by Operations Navigator 202. Referring first to FIG. 4, Operations Navigator interactive window 401 comprises root object pane 402, content pane 403, and task pane 404. Displayed in root object pane 402 are multiple groups of objects (high level objects). Objects are grouped first according to the server on which they reside. As shown in FIG. 4, "System1" is an identifier of a single server system 302. Beneath that designation in the object tree are multiple functional groupings of objects, i.e., "Basic Operations", "Job Management", "Configuration and Service", "Network", etc. Each of these functional groupings represent a collection of objects on the server system designated "System1". Although not shown in FIG. 4, in the case where multiple servers 302 are connected to the network, it would be possible to list multiple such server systems within the root object pane 402 of a single Operations Navigator window 401, so that the same window could be used to browse the object tree, manipulate objects, and launch tasks at different servers 302. The object groupings "Basic Operations", "Job Management", etc., would be repeated for each server 302 listed in root object pane 402 (to the extent such object groupings actually exist on each respective server).

As shown in FIG. 4, certain entries in root object pane 402 have an expansion sign ("[+]" or "[−]") in front of the entry. The expansion sign indicates that the entry may be expanded, i.e., that the entry may be subdivided into additional entries. If the expansion sign is "[+]", the additional entries from expansion are not listed in root object pane 402. If the expansion sign is "[−]", the additional entries are listed. The user clicks on the expansion sign with a pointing device 113 to toggle back and forth between "[+]" and "[−]", thus causing the expansion entries to appear or disappear. In the example shown in FIG. 4, the entry "System1" has a "[-]" expansion sign, indicating that it has been expanded already, specifically, the sub-entries "Basic Operations", "Job Management", "Configuration and Service", etc., are all listed by expanding the entry "System1", and would disappear from the listing if the expansion sign were reversed. Similarly, "Basic Operations" has been further expanded to reveal the sub-entries "Messages", "Printer Output", and "Printers". The entry "Job Management" contains a "[+]" expansion sign, indicating that it can be expanded, but the sub-entries are not listed. The sub-entries "Messages" and "Printer Output" can not be further expanded, there being no expansion sign, but "Printers" can be expanded.

An entry is selected from root object pane 402 by clicking on the entry with pointing device 113. Selecting an entry (high-level object, which represents a group of objects) in root object pane 402 causes two things to happen: the contents of the object are displayed in content pane 403, and the tasks associated with that object are displayed in task pane 404.

In the example window of FIG. 4, "Basic Operations" has been selected from root object pane 402. The contents of the "Basic Operations" group of objects are the subgroups "Messages", "Printer Output", and "Printers". As a consequence of selecting "Basic Operations", the corresponding subgroups are automatically listed in content pane 403, along with a brief description of the subgroups. In the example of FIG. 4, this repeats the sub-entries shown under the expanded "Basic Operations" entry in root object pane 402. However, the contents of content pane 403 are independent of whether an entry has been expanded in the root pane, so that if "Basic Operations" were selected but had not been expanded, the display in content pane would be the same.

As shown in FIG. 4, task pane 404 contains two portions, divided by a thin vertical line. The left portion 405 is labeled "My tasks", while the right portion 406 is labeled "Basic Operations tasks". Right portion 406 contains a listing of tasks relating to the object selected from root object pane 402. In the example of FIG. 4, the tasks "send a message", "monitor for messages", "share a printer", etc., all relate to messages or printers, which are the contents of "Basic Operations". The right portion header "Basic Operations tasks" reflects that the tasks therein relate to "Basic Operations", the selected object. The header text, as well as the listed tasks, change to correspond to the object selected from root object pane 402. Thus, if "Network" were selected from root object pane 402, the header of right portion 406 would be "Network tasks", and the tasks listed therein would correspond to network-related operations. Task configuration table 204 contains a mapping of tasks to objects in the root object pane, which is used by Operations Navigator 202 to construct task pane 404 in response to the user selection of an object in root object pane 402. In the preferred embodiment, task configuration table 204 is built by the code developers, and is not user configurable.

Left portion 405 of task pane 404 contains a listing of frequently executed tasks. This listing is maintained in user task profile 205, from which Operations Navigator 202 constructs left portion 405. The listing of tasks in left portion 405 is independent of the selection made in root object pane 402. Thus, in the example of FIG. 4, the tasks "add a connection" and "install additional components" are not related to messages and printers, which are the subjects of "Basic Operations". Left portion 405 is intended to provide the user with a shortcut to a relatively small number of frequently executed tasks, making it unnecessary to navigate an object tree or perform other operations to reach those tasks. The contents of left portion 405 are user configurable. The user may change the contents of left portion 405 by selecting "customize" button 410, or by dragging and dropping an icon from another menu, or by selecting a "customize taskpad" item from a drop-down menu (not shown).

Task entries listed in task pane 404 may be expanded in the same manner as object entries listed in root object pane 404. In the task pane, the expansion sign is the small arrow, which points to the right ("▸") when the entry is unexpanded, and points downward ("▼") when the entry is expanded. The lack of an arrow indicates that the entry can not be expanded. In the example of FIG. 4, the entry "Help for related tasks" in task pane 404 is capable of being expanded, although it is shown in unexpanded form. Selecting the arrow would cause the arrow to rotate downward, and additional related tasks to appear underneath the entry "Help for related tasks" in the task pane.

FIG. 5 shows another view of Operations Navigator window 401. In the example of FIG. 5, the "Messages" subgroup under "Basic Operations" in root object pane 402 is selected by the user. "Messages" can not be expanded into any further subgroups (there is no expansion sign in front of the "Messages" entry). I.e., the "Messages" subgroup consists of a collection of messages (message objects), which themselves do not contain other objects. In response to the user selection of "Messages", content pane 403 changes to display a list of the messages contained in the "Messages" subgroup, as shown in FIG. 5. It will be observed that task pane 404 does not change in response to selection of "Messages", i.e., the task entries in task pane 404 (specifically, right portion 406) are the same in FIGS. 4 and 5, and did not change in response to the user's selection of "Messages". In the preferred embodiment, task lists displayed in task pane right portion 406 are associated with the high-level object groups "Basic Operations", "Job Management", "Configuration and Service", etc., and not with subgroupings beneath these high-level groups. Therefore, when a subgroup beneath a high-level group is selected, the tasks displayed are the same as those which would be displayed for the high-level group. It should be understood that this particular mapping is simply one design choice, and it would alternatively be possible to associate lists of tasks in the task pane with subgroupings at any chosen level, or even with individual objects, if design considerations so warranted.

In the preferred embodiment, a user may invoke a task by selecting it from task pane 404 using pointing device 113. The "context" of a selected task is the server system under which a group was selected from root object pane 402. I.e., a task invoked from task pane 404 operates on the selected server system, or objects located therein. In the example shown in FIGS. 4 and 5, the server system designated "System1"is at the root of the selected entries "Basic Operations" and "Messages". Therefore, any task that would be selected from task pane 404 would operate on system "System1 ". Depending on the nature of the task, the task may bring up further interactive screens, requiring the user to select specific objects. For example, referring to FIG. 4, if a user were to select "Monitor Jobs" from task pane 404, a monitor jobs task would be invoked, which may display one or more screens showing job status, and providing the user with further options such as printing information, etc. The jobs so monitored would be limited to jobs run on server system "System1 ", even though client system 100 may be connected to several such server systems. A user wishing to monitor jobs on another server could select "Basic Operations" for the other server, followed by selecting "Monitor Jobs", to reach jobs on the other server.

In the preferred embodiment, the selection of a specific object in content pane 403 has no effect on the context of a task selection from task pane 404. Even if the task is one which relates to specific objects, the user will be required to select the object again from a selection menu presented by the task. For example, if in FIG. 4 a user were to select "Printers" from root object pane 402, and to further select a specific printer then displayed from content pane 403, the context of tasks remains system System1. If the user then selects "Share a printer" from task pane 404, the task may require the user to specify a printer. Maintaining context at the server system level improves the consistency of the interface. However, various alternatives are possible. It would alternatively be possible to import the object context from the object selected in either the root object pane 402 or the content pane 403, so that the user does not have to make another object selection. For example, if in the example above, context were imported from the object selected in the content pane, and the user selected a specific printer listed in the content pane, a subsequent selection of "share a printer" task from task pane 404 could execute that task with respect to the specific selected printer, without requiring the user to select a printer after the task was invoked.

FIG. 6 shows an another version of an Operations Navigator window 601 according to an alternative embodiment. In the embodiment of FIG. 6, there is no user-configurable left portion 405 of task pane 404. The entire task pane 604 of FIG. 6 is devoted to displaying tasks which are related to the selected object from the root object pane 602. The alternative embodiment of FIG. 6 reduces crowding in the Operations Navigator window, at the expense of foregoing a user-configurable fast path to certain tasks.

Figure 7:
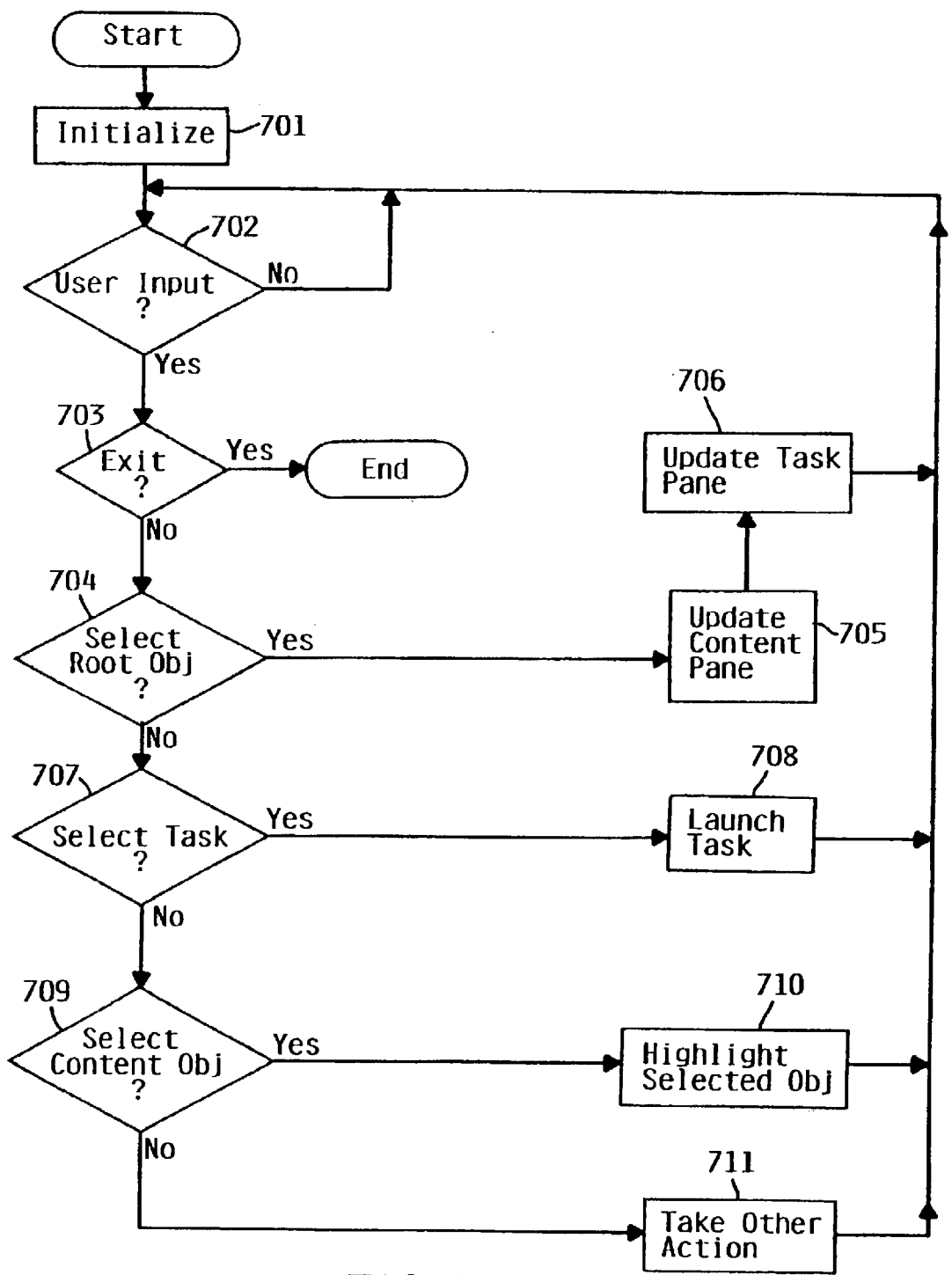
FIG. 7 illustrates the operation of the process navigation application according to the preferred embodiment.

The operation of the Operations Navigator 202 according to the preferred embodiment of the present invention will now be described, with reference to FIG. 7. As shown in FIG. 7, upon invoking Operations Navigator 202, the application is initialized at step 701. Initialization requires that state data 203 be obtained, from which the entries in root object pane 402 are built. State data 203 may have been saved locally (i.e., on client workstation 100) from a prior instantiation of Operations Navigator 202, or if not, it may be obtained by requesting each server system 302 connected to network 601 to provide the appropriate data for that server system. Operations Navigator also constructs and displays window 401, displaying the high-level object entries from state data 203 in root object pane 402. At initialization, nothing is displayed in content pane 403, since no object has been selected. Task pane left portion 405 displays tasks defined in user task profile 205, but right portion 406 is blank, no object having yet been selected.

After initialization, Operations Navigator waits for user input at step 702. Upon receiving a user selection, the "Y" branch from step 702 is taken to process the input appropriately. If the input is a "Exit" selection, i.e., exit the Operations Navigator application (step 703), then the application shuts itself down and ends. If the user input is a selection of an object from root object pane 402 (step 704), the selected object is highlighted, and Operation Navigator accesses state data 203 to determine the objects immediately below the selected object in the object tree hierarchy, and displays these objects in content pane 403 (step 705). Operations Navigator then accesses task configuration table 204 to determine the tasks which are associated with the selected object from root object pane 402, and displays these tasks in the right portion 406 of task pane 404 (step 706). Operations Navigator then returns to step 702 to await further user action.

If the user input is a task selection from task pane 404 (step 707), then Operations Navigator launches the selected task (step 708), and returns to step 702 to await further input. As explained above, the context of the task launched is the server system containing the selected object from root object pane 404. Launching of a task will generally bring another window (generated by the task) to the foreground. Operations Navigator remains active in the background, and the user may return to it, either by completing or closing the launched task, or by bringing the Operations Navigator to the foreground using any of various means known in the art of multi-tasking windows operation.

If the user input is a selection from content pane 403 (step 709), the selected object is highlighted (step 710), and Operations Navigator returns to step 702 to await further input. As explained above, such a selection has no effect on the operation of task pane 404, although it may affect the context of certain operations which may be selected from the menu bar or tool bar.

If the user input is any other type, i.e., the "N" branch from step 709, Operations Navigator responds by performing the appropriate action (step 711). Other actions may include, e.g., selections from the menu bar, selections from the tool bar, or the "customize" button 410 from task pane 404.

In the preferred embodiment described above, processing is done in a distributed manner, with each of multiple workstations having a copy of the Operations Navigator software 202, and the objects being maintained in one or more central file server. However, it will be appreciated that the present invention could be implemented in many different computing environments. Specifically, the present invention could be implemented on a stand-alone computer system, such as a "personal computer", wherein the objects shown in the object pane are directories, folders, or files in the storage of the stand-alone computer system, and tasks are run entirely locally on the stand-alone computer system. Alternatively, the invention could be implemented in a mainframe based computing environment, in which multiple interactive user terminals (which may or may not be "intelligent" workstations) are attached to a host computer system. In such cases, Operations Navigator 202 and associated files may reside in the host computer system, or may reside in the user terminals, or some functions may be in the host, while others are in the user terminals. Additionally, the Internet or a similar wide area network could be used to connect user workstations with a server computer system. Many additional variations in hardware and network configuration, or in allocation of function between user workstations and central hosts or servers, are possible, and the present invention should not be construed to be limited to any particular architecture.

In general, the routines executed to implement the illustrated embodiments of the invention, whether implemented as part of an operating system or a specific application, program, object, module or sequence of instructions are referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as computer-readable media including volatile and non-volatile memory devices, floppy disks, hard-disk drives, type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as data storage device 114.

Although a specific embodiment of the invention has been disclosed along with certain alternatives, it will be recognized by those skilled in the art that additional variations in form and detail may be made within the scope of the following claims:

What is claimed is:

1. A method for interactively selecting objects and tasks to perform operations in a computer system, comprising the steps of:
   presenting an interactive window to a user on a display of said computer system, said window having a plurality of panes, wherein a first pane comprises a listing of objects;
   receiving a selection of a first object in said first pane responsive to user movement of a pointing device;
   displaying a first set of tasks in a second pane of said interactive window responsive to receiving a selection of said first object, said first set of tasks being applicable to said first object;
   receiving a selection of a second object in said first pane responsive to user movement of said pointing device;
   displaying a second set of tasks in said second pane of said interactive window responsive to receiving a selection of said second object, said second set of tasks being applicable to said second object, said second set of tasks being different from said first set of tasks;
   receiving a selection of a task from said second set of tasks displayed in said second pane; and
   executing said task responsive to said selection.

2. The method of claim 1, wherein said interactive window further comprises a third pane, said third pane displaying a set of objects, said set of objects displayed in said third pane being responsive to a selected object in said first pane, said set of objects comprising objects contained in said selected object in said first pane.

3. The method of claim 1, wherein said second pane comprises a portion displaying a third set of tasks, said third set being a subset of said first set of tasks and a subset of said second set of tasks, said third set being independent of an object selected from said first pane.

4. The method of claim 3, wherein said third set of tasks displayed in said portion of said second pane is user-configurable.

5. The method of claim 1, wherein said computer system comprises at least one interactive workstation computer system for interactively displaying output and receiving input from a user, and at least one server computer system coupled to said at least one interactive workstation computer system via a network, wherein at least some of said objects listed in said first pane reside in said server computer system.

6. The method of claim 1, wherein said step of executing said task responsive to said selection comprises executing said task in a context determined by said second object.

7. A computer program product for managing the selection of objects and tasks on at least one computer system, said computer program product comprising:
   a plurality of processor executable instructions recorded on computer-readable media,
   a plurality of processor executable instructions recorded on signal-bearing media, wherein said instructions, when executed by at least one processor, cause the at least one computer to perform the steps of:
   presenting an interactive window to a user on a display of said computer system, said window having a plurality of panes, wherein a first pane comprises a listing of objects;
   receiving a selection of a first object in said first pane responsive to user movement of a pointing device;
   displaying a first set of tasks in a second pane of said interactive window responsive to receiving a selection of said first object, said first set of tasks being applicable to said first object;
   receiving a selection of a second object in said first pane responsive to user movement of said pointing device;
   displaying a second set of tasks in said second pane of said interactive window responsive to-receiving a selection of said second object, said second set of tasks being applicable to said second object, said second set of tasks being different from said first set of tasks;
   receiving a selection of a task from said second set of tasks displayed in said second pane; and
   invoking execution of said task responsive to said selection.

8. The computer program product of claim 7, wherein said interactive window further comprises a third pane, said third pane displaying a set of objects, said set of objects displayed in said third pane being responsive to a selected object in said first pane, said set of objects comprising objects contained in said selected object in said first pane.

9. The computer program product of claim 7, wherein said second pane comprises a portion displaying a third set of tasks, said third set being a subset of said first set of tasks and a subset of said second set of tasks, said third set being independent of an object selected from said first pane.

10. The computer program product of claim 9, wherein said third set of tasks displayed in said portion of said second pane is user-configurable.

11. The computer program product of claim 7, wherein said step of invoking execution of said task responsive to said selection comprises invoking execution of said task in a context determined by said second object.

12. A computer program product for providing a user interface to select objects and tasks on at least one computer system, said computer program product comprising:
   a plurality of processor executable instructions recorded on computer-readable media,
   a plurality of processor executable instructions recorded on signal-bearing media, wherein said instructions, when executed by at least one processor, cause the at least one computer system to present an interactive selection window to a user on a display, said window comprising:
   an first pane for listing a plurality of objects and receiving a user selection of an object listed therein;
   a second pane for listing a plurality of tasks and receiving a user selection of a task listed therein, said user selection of a task causing said task to be performed, wherein at least some of said plurality of tasks listed in said second pane are responsive to the object selected from said first pane.

13. The computer program product of claim 12, wherein said interactive selection window further comprises a third pane, said third pane displaying a set of objects, said set of objects displayed in said third pane being responsive to a selected object in said first pane, said set of objects comprising objects contained in said selected object in said first pane.

14. The computer program product of claim 12, wherein said second pane comprises a first portion and a second portion, said first portion for displaying a set of tasks independent of said object selected from said first pane, and said second portion for displaying a set of tasks responsive to said object selected from said first pane.

15. The computer program product of claim 14, wherein said set of tasks displayed in said third portion of said second pane is user-configurable.

16. The computer program product of claim 12, wherein a task selected from said second pane is performed in a context determined by context determined by said object selected from the first pane.

* * * * *